(12) United States Patent
Lee

(10) Patent No.: US 11,807,101 B2
(45) Date of Patent: Nov. 7, 2023

(54) HYBRID POWERTRAIN FOR VEHICLE

(71) Applicants: Hyundai Motor Company, Seoul (KR); Kia Corporation, Seoul (KR)

(72) Inventor: Sueng Ho Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/875,076

(22) Filed: Jul. 27, 2022

(65) Prior Publication Data

US 2023/0202284 A1 Jun. 29, 2023

(30) Foreign Application Priority Data

Dec. 28, 2021 (KR) .......................... 10-2021-0190030

(51) Int. Cl.
| | |
|---|---|
| *B60K 6/365* | (2007.10) |
| *B60K 6/442* | (2007.10) |
| *B60K 6/387* | (2007.10) |
| *B60K 6/547* | (2007.10) |
| *B60K 6/26* | (2007.10) |

(52) U.S. Cl.
CPC ................ *B60K 6/365* (2013.01); *B60K 6/26* (2013.01); *B60K 6/387* (2013.01); *B60K 6/442* (2013.01); *B60K 6/547* (2013.01); *F16H 2200/2005* (2013.01); *F16H 2200/2094* (2013.01)

(58) Field of Classification Search
CPC . F16H 2200/2094; B60K 6/365; B60K 6/387; B60K 6/442; B60K 6/547; B60K 6/26; B60K 6/42; B60K 6/38; B60K 6/40
USPC .................... 475/5, 200, 204, 206; 74/330
See application file for complete search history.

(56) References Cited

U.S. PATENT DOCUMENTS

| | | | |
|---|---|---|---|
| 9,533,679 B2 * | 1/2017 | Maruyama | B60K 17/02 |
| 9,770,971 B1 * | 9/2017 | Oba | F16H 3/66 |
| 10,479,350 B2 * | 11/2019 | Björkman | F16H 63/502 |
| 10,875,517 B2 * | 12/2020 | Gersten | B60W 10/30 |
| 11,084,368 B2 * | 8/2021 | Dempel | B60K 6/547 |
| 2010/0130323 A1 * | 5/2010 | Gumpoltsberger | F16H 3/66 475/275 |
| 2020/0331336 A1 * | 10/2020 | Kaltenbach | F16H 37/065 |

FOREIGN PATENT DOCUMENTS

| | | |
|---|---|---|
| JP | 5136660 | 2/2013 |
| WO | WO2023035389 A1 * | 3/2023 |

* cited by examiner

*Primary Examiner* — Roger L Pang
(74) *Attorney, Agent, or Firm* — MORGAN, LEWIS & BOCKIUS LLP

(57) ABSTRACT

A hybrid powertrain apparatus for a vehicle, includes first and second input shafts concentrically provided to selectively receive power of an engine, a planetary gear set including a first rotation element, a second rotation element, and a third rotation element, wherein the first rotation element is connected to the first input shaft and the second rotation element is connected to a first motor, a clutch device configured to fix the remaining rotation element of the planetary gear set or connect the remaining rotation element to the second input shaft, a second motor connected to the second input shaft, and an output gear provided on the second input shaft.

16 Claims, 6 Drawing Sheets

FIG. 2

| MODE | MG1 | ① | ② | ③ | MG2 | CL1 | CL2 | ENGINE | Wheel |
|---|---|---|---|---|---|---|---|---|---|
| EV1 | REVERSE OPERATION | × | × | ○ | REVERSE OPERATION | × | × | STOP | FORWARD OPERATION |
| HEV1 | Brake or REVERSE OPERATION | × | × | ○ | Free | ○ | × | REVERSE OPERATION | FORWARD OPERATION |
| EV2 | Free | × | ○ | × | REVERSE OPERATION | × | × | STOP | FORWARD OPERATION |
| HEV2 | REVERSE OPERATION | ○ | × | × | REVERSE OPERATION | ○ | × | REVERSE OPERATION | FORWARD OPERATION |
| REVERSE HEV | Free | × | ○ | × | FORWARD OPERATION | × | ○ | REVERSE OPERATION | REVERSE OPERATION |
| REVERSE EV1 | FORWARD OPERATION | × | × | ○ | FORWARD OPERATION | × | × | STOP | REVERSE OPERATION |
| REVERSE EV2 | Free | × | ○ | × | FORWARD OPERATION | × | × | STOP | REVERSE OPERATION |
| REGENERATION | Free | × | ○ | × | REGENERATION | × | × | STOP | BRAKING |

HYBRID POWERTRAIN FOR VEHICLE

CROSS-REFERENCE TO RELATED APPLICATION

The present application claims priority to Korean Patent Application No. 10-2021-0190030, filed Dec. 28, 2021, the entire contents of which is incorporated herein for all purposes by this reference.

BACKGROUND OF THE PRESENT DISCLOSURE

Field of the Present Disclosure

The present disclosure relates to a technology related to a structure of a hybrid powertrain for a vehicle.

Description of Related Art

A hybrid vehicle refers to a vehicle capable of improving fuel economy by appropriately combining power from an internal combustion engine and power from a motor operated by electricity.

A powertrain for a hybrid vehicle needs to appropriately combine the power from the engine and the power from the motor depending on a driving situation of the vehicle to exhibit maximum performance of the engine and the motor and provide various operation modes capable of achieving excellent efficiency.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a hybrid powertrain for a vehicle, which is configured for allowing an engine to operate at an optimal operating point and providing various operation modes by implementing various connection relationships between a motor and the engine, improving fuel economy, power performance, and drivability of a vehicle.

To achieve the above-mentioned object, various aspects of the present disclosure are directed to providing a hybrid powertrain apparatus a vehicle, the hybrid powertrain apparatus including: first and second input shafts concentrically provided to selectively receive power of an engine; a planetary gear set including a first rotation element, a second rotation element, and a third rotation element, wherein the first rotation element is connected to the first input shaft and the second rotation element is connected to a first motor; a clutch device configured to fix the third rotation element of the planetary gear set or connect the third rotation element to the second input shaft; a second motor connected to the second input shaft; and an output gear provided on the second input shaft.

The second input shaft may be configured as a hollow shaft which is provided to penetrate the inside of the second motor, the first input shaft may be provided to penetrate the inside of the second input shaft, the first input shaft may be connected to the engine through a first clutch, and the second input shaft may be connected to the engine through a second clutch.

A sun gear of the planetary gear set may be connected to the first input shaft, a ring gear of the planetary gear set may be connected to the first motor, and a planet carrier of the planetary gear set may be connected to the clutch device.

The clutch device may include: a sleeve provided on an external peripheral surface of a hub gear connected to the planet carrier, wherein the sleeve is rectilinearly slidable in an axial direction of the second input shaft thereof; a fixed gear fixed to a transmission housing, wherein the sleeve is selectively engaged with the fixed gear; and a connection gear connected to the second input shaft, wherein the sleeve is rectilinearly slidable to be engaged with the connection gear.

The hub gear may be provided between the fixed gear and the connection gear, in which when the sleeve moves in a first direction from a neutral state in which the sleeve engages only with the hub gear, a fixed state in which the sleeve engages with the hub gear and the fixed gear may be selectively implemented, and in which when the sleeve moves in a second direction from the neutral state, a connected state in which the sleeve engages with the hub gear and the connection gear may be selectively implemented.

A differential gear of a differential may engage with an output gear provided on the second input shaft.

To achieve the above-mentioned object, various aspects of the present disclosure are directed to providing a hybrid powertrain apparatus for a vehicle, the hybrid powertrain apparatus including: a planetary gear set including three rotation elements; a first motor connected to one rotation element of the planetary gear set; a first input shaft connected to another rotation element of the planetary gear set; an engine selectively connectable to the first input shaft; a second input shaft selectively connectable to the engine; a second motor connected to the second input shaft; a clutch device configured to fix the remaining rotation element of the planetary gear set to a transmission housing or connect the remaining rotation element of the planetary gear set to the second input shaft; and an output gear integrally provided on the second input shaft.

The rotation elements of the planetary gear set may be a sun gear, a ring gear, and a planet carrier, the sun gear may be connected to the first input shaft, the ring gear may be connected to the first motor, and the planet carrier may be connected to the clutch device.

The first input shaft may be selectively connectable to the engine through a first clutch, the second input shaft may be selectively connectable to the engine through a second clutch, and the first clutch and second clutch may be configured as a friction clutch.

The clutch device may be configured by a dog clutch or synchronizer of which the engagement state is changed as a sleeve rectilinearly slides in an axial direction thereof.

The clutch device may include: a hub gear connected to the planet carrier; a sleeve provided on an external peripheral surface of the hub gear and configured to be rectilinearly slidable in an axial direction thereof; a fixed gear fixed to the transmission housing and configured so that the sleeve rectilinearly slides and engages with the fixed gear; and a connection gear connected to the second input shaft, wherein the sleeve is rectilinearly slidable to be engaged with the connection gear.

The output gear may be provided between the clutch device and the second motor and integrated with the second input shaft, and a differential gear of a differential may engage with the output gear.

Various aspects of the present disclosure are directed to providing the hybrid powertrain for a vehicle, which is configured for allowing the engine to operate at the optimal operating point and providing various operation modes by implementing various connection relationships between the motor and the engine, improving fuel economy, power performance, and drivability of the vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 2 is a table illustrating operating modes of the powertrain apparatus illustrated in FIG. 1.

Figure 1:
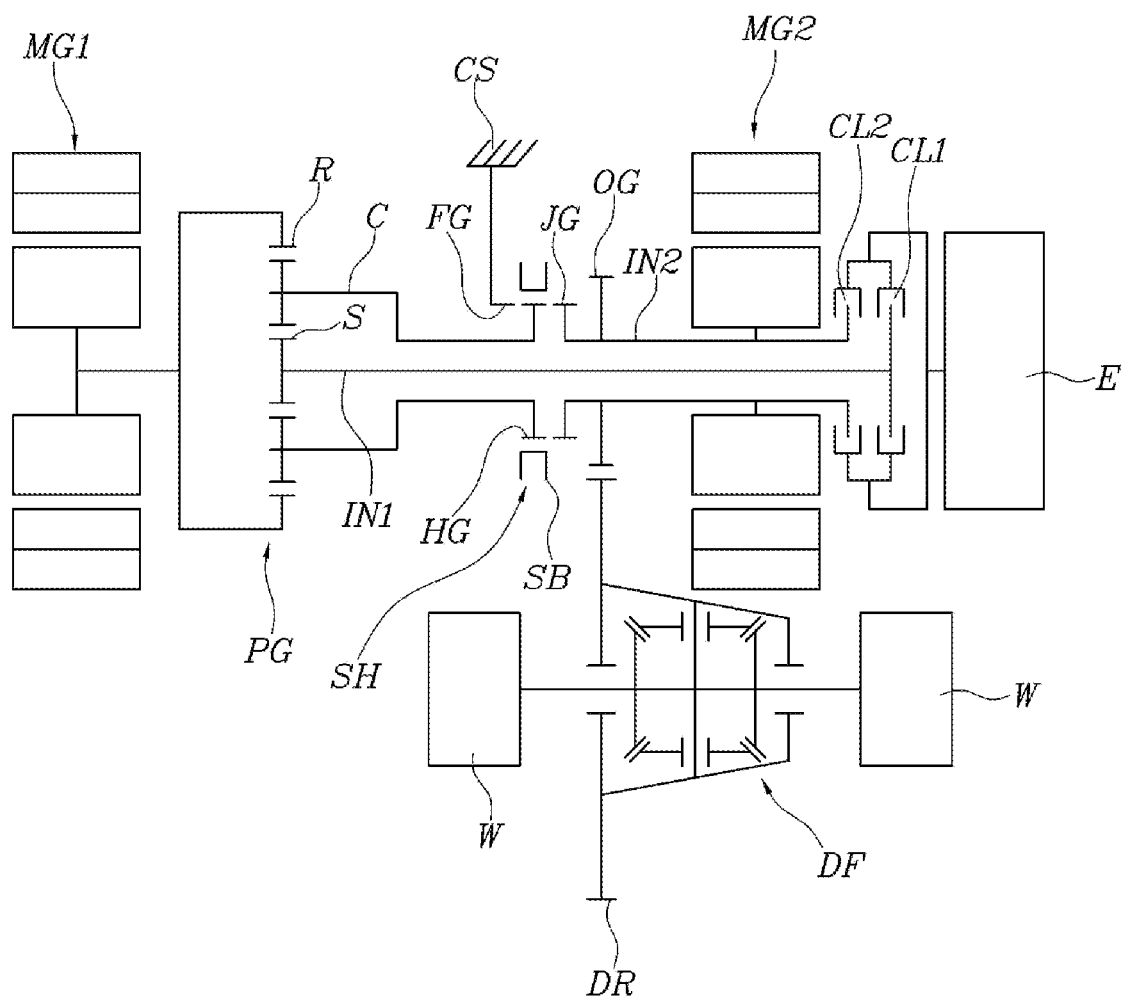
FIG. 1 is a configuration view of a hybrid powertrain apparatus for a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions of exemplary embodiments of the present disclosure included in the exemplary embodiment or application are exemplified only for explaining the exemplary embodiments according to an exemplary embodiment of the present disclosure, the exemplary embodiments of the present disclosure may be carried out in various forms, and it should not be interpreted that the present disclosure is limited to the exemplary embodiments described in the exemplary embodiment or application.

Because the exemplary embodiments of the present disclosure may be variously changed and may have various forms, specific exemplary embodiments will be illustrated in the drawings and described in detail in the exemplary embodiment or application. However, the descriptions of the specific exemplary embodiments are not intended to limit exemplary embodiments according to the concept of the present disclosure to the specific exemplary embodiments of the present disclosure, but it should be understood that the present disclosure covers all modifications, equivalents and alternatives falling within the spirit and technical scope of the present disclosure.

The terms such as "first" and/or "second" may be used to describe various constituent elements, but these constituent elements should not be limited by these terms. These terms are used only for distinguishing one constituent element from other constituent elements. For example, without departing from the scope according to the concept of the present disclosure, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or directly connected to another constituent element, and an intervening constituent element can also be present between the constituent elements. When one constituent element is described as being "directly coupled to" or "directly connected to" another constituent element, it should be understood that no intervening constituent element is present between the constituent elements. Other expressions, that is, "between" and "just between" or "adjacent to" and "directly adjacent to", for explaining a relationship between constituent elements, may be interpreted in a similar manner.

The terms used in the exemplary embodiment are used to just describe a specific embodiment and do not intend to limit the present disclosure. Singular expressions include plural expressions unless clearly described as different meanings in the context. In the present specification, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which an exemplary embodiment of the present disclosure pertains. The terms such as those defined in a commonly used dictionary should be interpreted as having meanings consistent with meanings in the context of related technologies and should not be interpreted as ideal or excessively formal meanings unless explicitly defined in the present specification.

Hereinafter, the present disclosure will be described in detail through detailed description of the present disclosure with reference to the accompanying drawings. Like reference numerals indicated in the respective drawings refer to like members.

Referring to FIG. 1, a hybrid powertrain apparatus for a vehicle according to various exemplary embodiments of the present disclosure includes first and second input shafts IN1 and IN2 concentrically provided to selectively receive power of an engine E; a planetary gear set PG including three rotation elements including one rotation element connected to the first input shaft IN1 and another rotation element is connected to a first motor MG1; a clutch device SH configured to fix the remaining rotation element of the planetary gear set PG or connect the remaining rotation element of the planetary gear set PG to the second input shaft IN2; a second motor MG2 connected to the second input shaft IN2; and an output gear OG provided on the second input shaft IN2.

That is, the power of the engine E may be inputted through the first input shaft IN1 or the second input shaft IN2. The planetary gear set PG may receive the power of the engine E through the first input shaft IN1, receive the power of the first motor MG1, and transmit the power to the clutch device SH. Both the second motor MG2 and the output gear OG are provided on the second input shaft IN2 so that the power of the second motor MG2 may be always transmitted to the output gear OG.

The second input shaft IN2 is configured as a hollow shaft which is provided to penetrate the inside of the second motor MG2. The first input shaft IN1 is provided to penetrate the inside of the second input shaft IN2. The first input shaft IN1 is connected to the engine E through a first clutch CL1, and the second input shaft IN2 is connected to the engine E through a second clutch CL2.

Therefore, the power of the engine E is transmitted to the first input shaft IN1 when the first clutch CL1 engages, and the power of the engine E is transmitted to the second input shaft IN2 when the second clutch CL2 engages.

As illustrated in the drawings, the first clutch and second clutch CL1 and CL2 are configured as disc-type friction clutches or the like and may increase torque to be transmitted as the frictional force increases.

As illustrated, the planetary gear set PG may be configured as a simple single-pinion planetary gear set including a sun gear S, a ring gear R, and a planet carrier C as the three rotation elements. The sun gear S of the planetary gear set PG is connected to the first input shaft IN1, the ring gear R of the planetary gear set PG is connected to the first motor MG1, and the planet carrier C of the planetary gear set PG is connected to the clutch device SH.

The clutch device SH includes: a sleeve SB provided on an external peripheral surface of a hub gear HG connected to the planet carrier C, the sleeve SB being configured to be rectilinearly slidable in an axial direction thereof; a fixed gear FG fixed to a transmission housing CS and configured so that the sleeve SB rectilinearly slides and engages with the fixed gear FG; and a connection gear JG connected to the second input shaft IN2 and configured so that the sleeve SB rectilinearly slides and engages with the connection gear JG.

The hub gear HG is provided between the fixed gear FG and the connection gear JG. When the sleeve SB moves in a first direction from a neutral state in which the sleeve SB engages only with the hub gear HG, a fixed state in which the sleeve SB engages with both the hub gear HG and the fixed gear FG is implemented. When the sleeve SB moves in a second direction from the neutral state, a connected state in which the sleeve SB engages with both the hub gear HG and the connection gear JG is implemented. The fixed state and the connected state may be selectively implemented.

Therefore, the sleeve SB may be provided to be rectilinearly slidable in the axial direction by a single linear actuator. In the instant case, the term 'axial direction' means a longitudinal direction of the second input shaft IN2.

For reference, the clutch device SH may be configured by a dog clutch or synchronizer of which the engagement state is changed as the sleeve SB rectilinearly slides in the axial direction thereof.

In the instant case, the synchronizer refers to a device including a synchronizer ring, a key, and the like for synchronizing a relative velocity between the two rotating bodies to be coupled by the sleeve SB. The dog clutch refers to a device that does not have the synchronizer ring, the key, and the like and thus requires a synchronization action made by the first motor MG1 or the second motor MG2 to implement the engagement of the sleeve SB.

In an exemplary embodiment of the present disclosure, a differential gear DR of a differential DF engages with the output gear OG provided on the second input shaft IN2.

Therefore, a rotation force of the output gear OG is transmitted to the differential gear DR of the differential DF and transmitted to two opposite driving wheels W connected to two opposite side gears of the differential DF.

For reference, a parking gear may be provided on a driveshaft configured to connect the driving wheels W and the side gears of the differential DF, and the parking gear may be fixed by a device such as a parking sprag, implementing a parking function.

The hybrid powertrain apparatus for a vehicle illustrated in FIG. 1 may implement operating modes illustrated in FIG. 2. The hybrid powertrain apparatus for a vehicle may be simplified by a lever diagram in which the planetary gear set PG is expressed by S, C, and R, as illustrated in FIG. 3.

Figure 3:
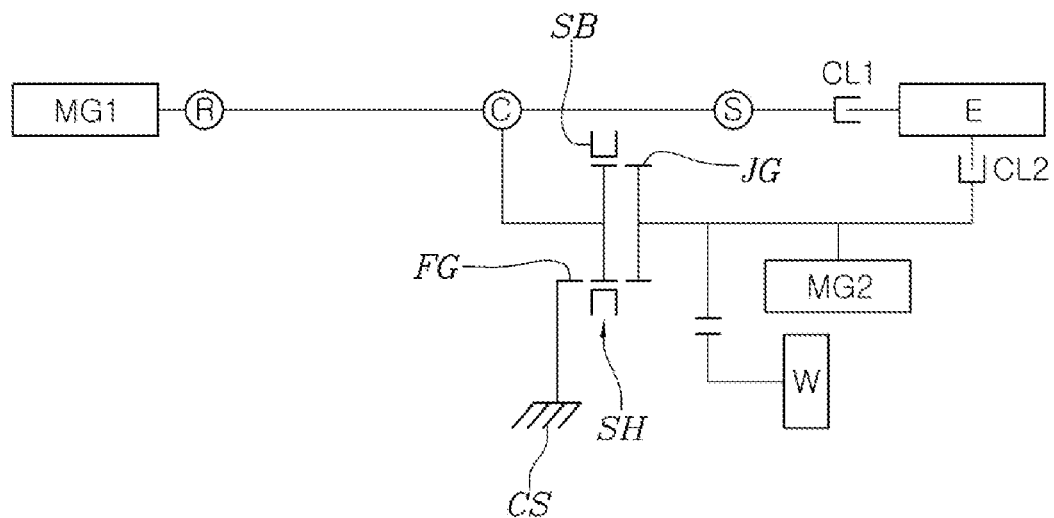
FIG. 3 is a lever diagram simply illustrating the powertrain apparatus illustrated in FIG. 1.

Hereinafter, some of the operating modes illustrated in FIG. 2 will be described with reference to the lever diagram, as illustrated in FIG. 3.

Figure 4:
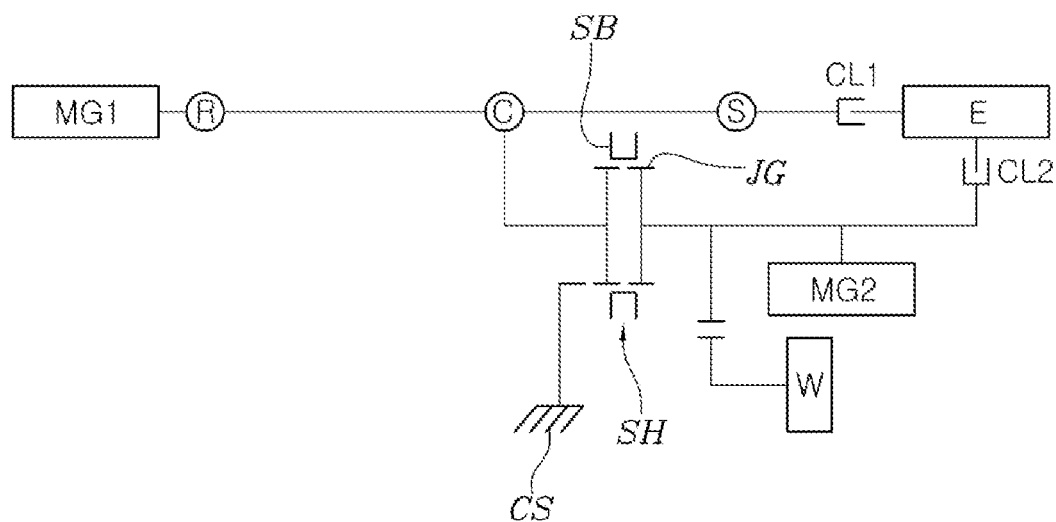
FIG. 4 is a view for explaining a state in which the powertrain apparatus illustrated in FIG. 1 implements an EV1 mode.

FIG. 4 illustrates an EV1 mode in which the clutch device SH implements the connected state in which the sleeve SB engages with both the hub gear HG and the connection gear JG, the first clutch CL1 and the second clutch CL2 are in a disengaged state, and the engine E is in a stopped state.

For reference, the operating states of the clutch device SH are classified into ①, ②, and ③ in FIG. 2. ① means the fixed state in which the sleeve SB engages with both the fixed gear FG and the hub gear HG, ② means the neutral state in which the sleeve SB engages only with the hub gear HG, ③ means the connected state in which the sleeve SB engages with both the hub gear HG and the connection gear JG.

On the assumption that an operation direction of the engine E is a forward direction, the first and second motors MG1 and MG2 operate in a reverse direction in the instant state, and the power of the first and second motors MG1 and MG2 is transmitted to the driving wheels W through the output gear OG and the differential gear DR of the differential DF. Therefore, the driving wheels W operate in the forward direction, and the vehicle moves forward thereof.

For reference, the first motor MG1 may rotate at the same speed as the second motor MG2, and all the rotation elements of the planetary gear set PG may integrally operate so that unnecessary noise or abrasion may not be caused by an internal rotation of the planetary gear set PG.

Figure 5:
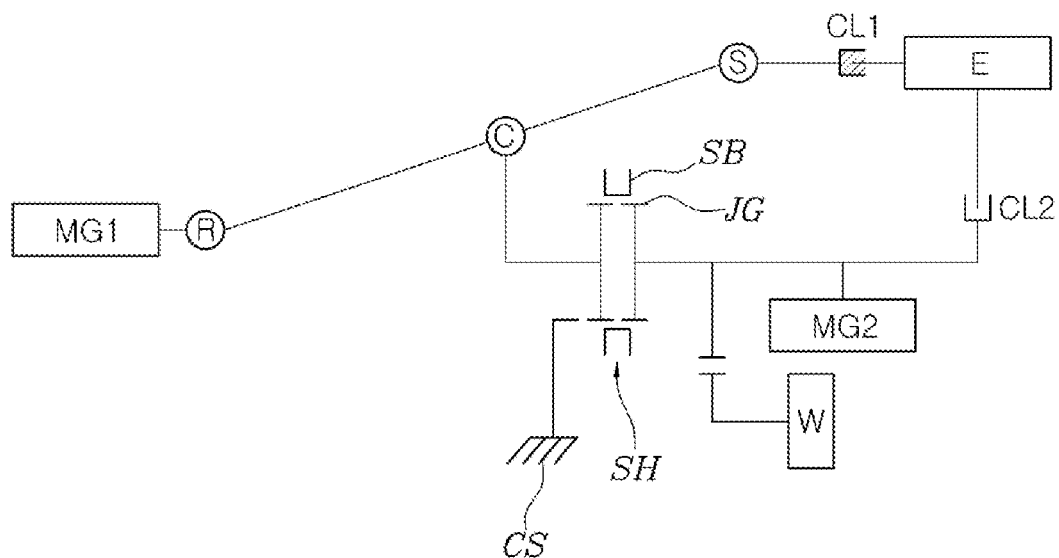
FIG. 5 is a view for explaining a state in which the powertrain apparatus illustrated in FIG. 1 implements an HEV1 mode.

FIG. 5 illustrates an HEV1 mode in which the clutch device SH implements the connected state in which the sleeve SB engages with both the hub gear HG and the connection gear JG, the first clutch CL1 is in an engaged state, the second clutch CL2 is in a disengaged state, and the engine E is in a driving state.

The power of the engine E is transmitted to the connection gear JG through the planetary gear set PG and then transmitted to the differential DF. The first motor MG1 performs braking or operates reversely to provide a reaction force that allows the power, which is transmitted to the sun gear S from the engine E, to be reversely transmitted to the planet carrier C and then transmitted to the connection gear JG.

An EV2 mode may be implemented in a state illustrated in FIG. 3. The clutch device SH implements the neutral state, both the first clutch and second clutch CL1 and CL2 are in the disengaged state, and the engine E is in the stopped state.

In the present state, the driving wheels W are rotated forward by the reverse operation of the second motor MG2, and the vehicle moves forward thereof.

Figure 6:
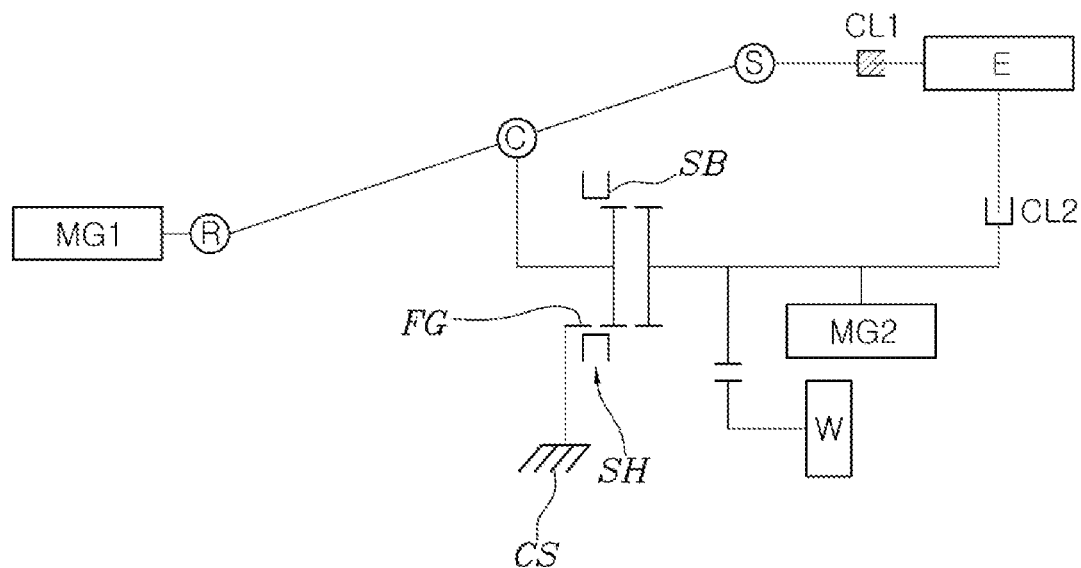
FIG. 6 is a view for explaining a state in which the powertrain apparatus illustrated in FIG. 1 implements an HEV2 mode.

FIG. 6 illustrates an HEV2 mode. The present mode is substantially a series type hybrid mode.

The clutch device SH implements the fixed state, the planet carrier C of the planetary gear set PG is in the fixed state, the first clutch CL1 is in the engaged state, the second clutch CL2 is in the disengaged state, and the engine E is in the driving state.

The vehicle is operated by the power transmitted to the differential DF as the second motor MG2 operates reversely. Because the planet carrier C is fixed, the power of the engine E is transmitted to the first motor MG1 while operating the ring gear R reversely, and the first motor MG1 generates electricity by use of the power provided from the engine E.

The electricity generated by the first motor MG1 is transmitted to the second motor MG2 through a battery, implementing the series type hybrid mode.

Figure 7:
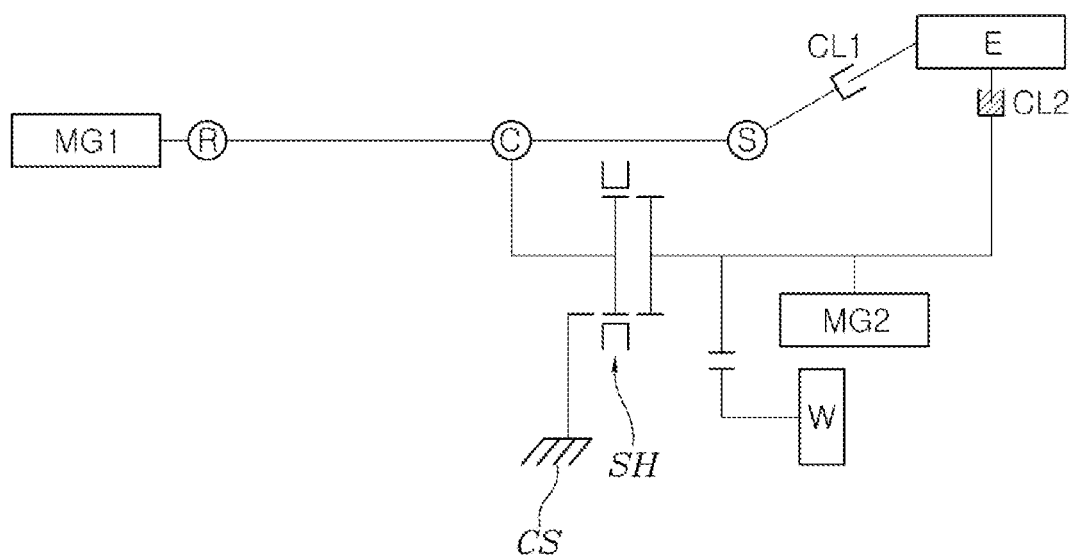
FIG. 7 is a view for explaining a state in which the powertrain apparatus illustrated in FIG. 1 implements a rearward HEV mode.

FIG. 7 illustrates a reverse HEV mode in which the clutch device SH implements the neutral state, the first clutch CL1 is in the disengaged state, the second clutch CL2 is in the engaged state, and the engine E and the second motor MG2 are in the driving state.

The engine E and the second motor MG2 operate in the forward direction, but the power thereof is reversed by the output gear OG and the differential gear DR of the differential DF so that the driving wheels W operate reversely, and the vehicle moves rearward.

A reverse EV1 mode may be implemented by reversing the operation directions of the first and second motors MG1 and MG2 in the EV1 mode.

That is, the reverse EV1 mode may be implemented by operating the first and second motors MG1 and MG2 forward in the state illustrated in FIG. 4.

Furthermore, a reverse EV2 mode may be implemented by reversing the operation direction of the second motor MG2 in the EV2 mode.

That is, the reverse EV2 mode may be implemented by operating the second motor MG2 forward in the state illustrated in FIG. 3.

Meanwhile, as illustrated in FIG. 3, a regeneration mode is implemented as the second motor MG2 performs regenerative braking by use of the power transmitted from the driving wheels W in a state in which the clutch device SH implements the neutral state and the first clutch and second clutch CL1 and CL2 are disengaged.

Figure 8:
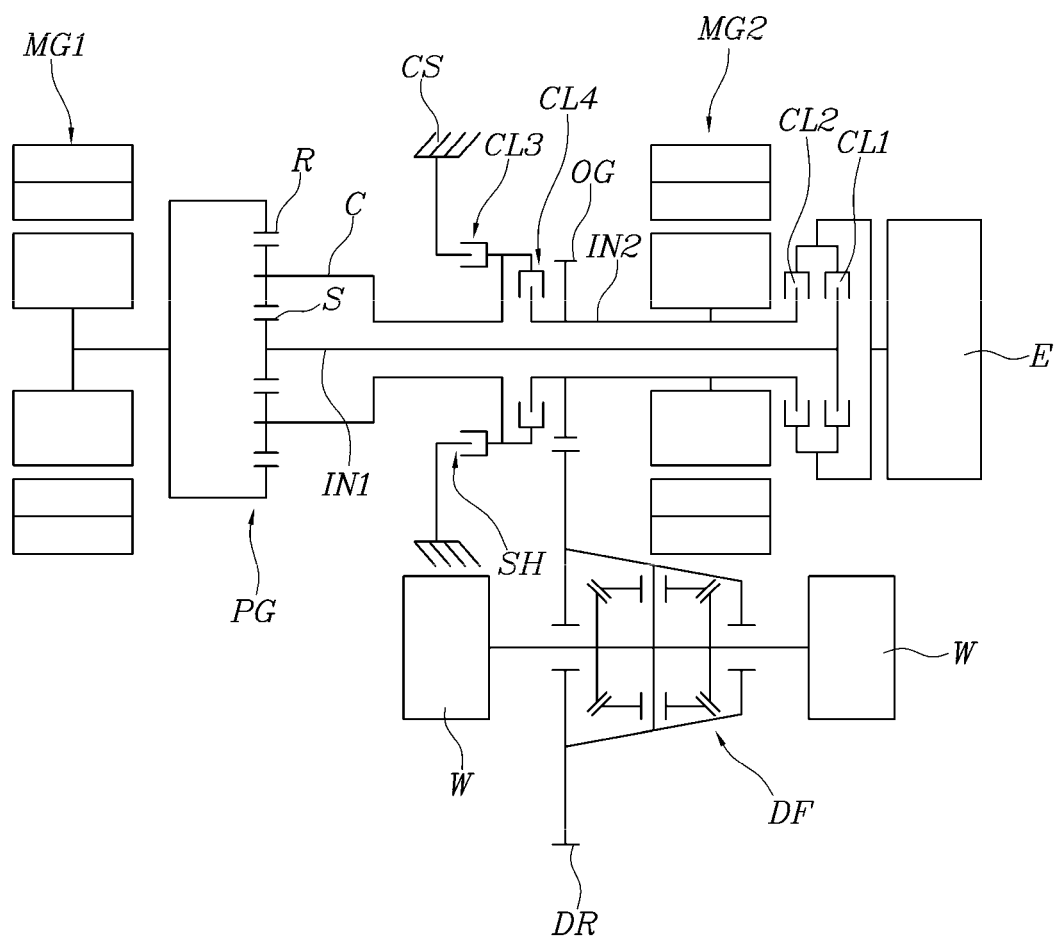
FIG. 8 is a view exemplarily illustrating another exemplary embodiment of the hybrid powertrain apparatus for a vehicle according to an exemplary embodiment of the present disclosure.

Meanwhile, FIG. 8 illustrates another exemplary embodiment of the present disclosure. Another exemplary embodiment of the present disclosure differs from the above-mentioned embodiment only in terms of the clutch device SH, and the other configurations of another exemplary embodiment are identical to those in the exemplary embodiment illustrated in FIG. 1. The clutch device SH includes: a third clutch CL3 configured to connect or disconnect the planet carrier C to or from the transmission housing CS; and a fourth clutch CL4 configured to connect or disconnect the planet carrier C to or from the second input shaft IN2.

Like the first clutch and second clutch CL1 and CL2, the third and fourth clutches CL3 and CL4 may be configured as a friction clutch.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A hybrid powertrain apparatus for a vehicle, the hybrid powertrain apparatus comprising:
   first and second input shafts concentrically provided to selectively receive power of an engine;
   a planetary gear set including a first rotation element, a second rotation element, and a third rotation element, wherein the first rotation element is connected to the first input shaft and the second rotation element is connected to a first motor;
   a clutch device configured to fix the third rotation element of the planetary gear set or connect the third rotation element to the second input shaft;
   a second motor connected to the second input shaft; and
   an output gear provided on the second input shaft,
   wherein the third rotation element of the planetary gear set is connected to the clutch device, and wherein the clutch device includes:
a sleeve provided on an external peripheral surface of a hub gear connected to the third rotation element, wherein the sleeve is rectilinearly slidable in an axial direction of the second input shaft;
a fixed gear fixed to a transmission housing, wherein the sleeve is selectively engaged with the fixed gear to fix the third rotation element of the planetary gear set to the transmission housing; and
a connection gear connected to the second input shaft, wherein the sleeve is rectilinearly slidable to be engaged with the connection gear to connect the third rotation element to the second input shaft.

2. The hybrid powertrain apparatus of claim 1, wherein the second input shaft is a hollow shaft and is provided to penetrate an inside of the second motor, the first input shaft is provided to penetrate an inside of the second input shaft, the first input shaft is selectively connectable to the engine through a first clutch, and the second input shaft is selectively connectable to the engine through a second clutch.

3. The hybrid powertrain apparatus of claim 1,
wherein the first rotation element, the second rotation element, and the third rotation element are a sun gear, a ring gear and a planet carrier, respectively.

4. The hybrid powertrain apparatus of claim 1, wherein the hub gear is provided between the fixed gear and the connection gear,
wherein when the sleeve moves in a first direction from a neutral state in which the sleeve engages only with the hub gear, the sleeve engages with the hub gear and the fixed gear, and
wherein when the sleeve moves in a second direction from the neutral state, the sleeve engages with the hub gear and the connection gear.

5. The hybrid powertrain apparatus of claim 1, wherein the clutch device includes:
a third clutch configured to connect or disconnect the third rotation element to or from the transmission housing; and
a fourth clutch configured to connect or disconnect the third rotation element to or from the second input shaft.

6. The hybrid powertrain apparatus of claim 5,
wherein the third clutch and the fourth clutch are connected to the third rotation element in parallel.

7. The hybrid powertrain apparatus of claim 5,
wherein the first rotation element, the second rotation element, and the third rotation element are a sun gear, a ring gear and a planet carrier, respectively.

8. The hybrid powertrain apparatus of claim 1, wherein a differential gear of a differential engages with the output gear provided on the second input shaft.

9. A hybrid powertrain apparatus for a vehicle, the hybrid powertrain apparatus comprising:
a planetary gear set including a first rotation element, a second rotation element, and a third rotation element;
a first motor connected to the first rotation element of the planetary gear set;
a first input shaft connected to the second rotation element of the planetary gear set;
an engine selectively connectable to the first input shaft;
a second input shaft selectively connectable to the engine;
a second motor connected to the second input shaft;
a clutch device configured to fix the third rotation element of the planetary gear set to a transmission housing or connect the third rotation element of the planetary gear set to the second input shaft; and
an output gear integrally provided on the second input shaft,
wherein the third rotation element is connected to the clutch device, and
wherein the clutch device includes:
a hub gear connected to the third rotation element;
a sleeve provided on an external peripheral surface of the hub gear and configured to be rectilinearly slidable in an axial direction of the second input shaft;
a fixed gear fixed to the transmission housing, wherein the sleeve is rectilinearly slidable to be engaged with the fixed gear; and
a connection gear connected to the second input shaft, wherein the sleeve is rectilinearly slidable to be engaged with the connection gear.

10. The hybrid powertrain apparatus of claim 9,
wherein the first rotation element, the second rotation element, and the third rotation element are a ring gear, a sun gear and a planet carrier, respectively.

11. The hybrid powertrain apparatus of claim 9, wherein the first input shaft is selectively connectable to the engine through a first clutch, the second input shaft is selectively connectable to the engine through a second clutch, and the first clutch and second clutch are configured as a friction clutch.

12. The hybrid powertrain apparatus of claim 11, wherein the clutch device is configured by a dog clutch or synchronizer of which engagement state is changed as the sleeve rectilinearly slides in an axial direction of the second input shaft.

13. The hybrid powertrain apparatus of claim 11,
wherein the first rotation element, the second rotation element, and the third rotation element are a ring gear, a sun gear and a planet carrier, respectively.

14. The hybrid powertrain apparatus of claim 11, wherein the output gear is provided between the clutch device and the second motor and integrated with the second input shaft, and a differential gear of a differential engages with the output gear.

15. The hybrid powertrain apparatus of claim 11, wherein the clutch device includes:
a third clutch configured to connect or disconnect the third rotation element to or from the transmission housing; and
a fourth clutch configured to connect or disconnect the third rotation element to or from the second input shaft.

16. The hybrid powertrain apparatus of claim 15,
wherein the third clutch and the fourth clutch are connected to the third rotation element in parallel.

* * * * *